US008387350B2

(12) United States Patent
Slater et al.

(10) Patent No.: US 8,387,350 B2
(45) Date of Patent: Mar. 5, 2013

(54) GRASS TREATMENT DEVICE (75) Inventors: Tom Slater, Sheffield (GB); Jack Copeland, Sheffield (GB); John Coleman, Sheffield (GB)

(73) Assignee: Advanced Engineering Techniques Limited, Sheffield (GB)

( * ) Notice: Subject to any disclaimer, the term of this patent is extended or adjusted under 35 U.S.C. 154(b) by 472 days.

(21) Appl. No.: 11/456,018

(22) Filed: Jul. 6, 2006

(65) Prior Publication Data
US 2007/0007200 A1    Jan. 11, 2007

(30) Foreign Application Priority Data

Jul. 6, 2005  (GB) .................................. 0513776.5

(51) Int. Cl.
*A01D 34/00*    (2006.01)
(52) U.S. Cl. ........................................................ 56/17.2
(58) Field of Classification Search ................ 56/7, 17.1, 56/17.2, 249, 294, DIG. 16, DIG. 20
See application file for complete search history.

(56) References Cited

U.S. PATENT DOCUMENTS

| | | | | |
|---|---|---|---|---|
| 2,292,926 | A | 3/1960 | Rowe et al. ................. | 280/43.2 |
| 2,926,926 | A * | 3/1960 | Rowe et. al. ................ | 280/43.2 |
| 3,161,006 | A | 12/1964 | Willette et al. ............... | 56/25.4 |
| 3,680,293 | A * | 8/1972 | Klemenhagen ................ | 56/249 |
| 3,918,239 | A * | 11/1975 | Aldred et al. .................. | 56/7 |
| 4,006,580 | A | 2/1977 | Kalleicher .................... | 56/17.2 |
| 4,441,306 | A | 4/1984 | Kuhn ............................ | 56/15.9 |
| 4,577,455 | A | 3/1986 | Amano et al. ................. | 56/17.1 |
| 5,031,335 | A | 7/1991 | Kimmelman ................... | 33/655 |
| 5,085,044 | A | 2/1992 | Freier, Jr. et al. .............. | 56/13.5 |
| 5,161,353 | A | 11/1992 | Bergkamp et al. ............. | 56/14.7 |
| 5,203,151 | A | 4/1993 | Mills .............................. | 56/17.2 |
| 5,241,810 | A * | 9/1993 | Reichen ......................... | 56/249 |
| 5,624,214 | A | 4/1997 | Carroll .......................... | 408/226 |
| 5,797,252 | A * | 8/1998 | Goman .......................... | 56/17.2 |
| 6,073,357 | A | 6/2000 | Kosmalski ..................... | 33/628 |
| 6,206,393 | B1 * | 3/2001 | Mascari et al. ............... | 280/220 |
| 6,276,119 | B1 | 8/2001 | Oshima et al. ................ | 56/17.1 |

(Continued)

FOREIGN PATENT DOCUMENTS

| | | |
|---|---|---|
| CA | 2551359 | 9/2010 |
| DE | 29502274.4 | 6/1995 |

(Continued)

OTHER PUBLICATIONS

Third Party Observations, pp. 1-8 (Dec. 12, 2007).

(Continued)

*Primary Examiner* — Thomas B Will
*Assistant Examiner* — Mai Nguyen
(74) *Attorney, Agent, or Firm* — Harness, Dickey & Pierce, P.L.C.

(57) ABSTRACT

A grass treatment device 801 that comprises a first roller 701 configured to contact a grass surface 802, a second roller 805 configured to contact the grass surface 802, a treatment tool 804 capable of treating the grass surface 804. The grass treatment device 801 further comprises adjustment means 303, 305 configured to allow an adjustment of a distance between the treatment tool 804 and the first roller 701, the adjustment capable of affecting a distance 807 between the tool 804 and the grass surface 802. The adjustment means 303, 305 further comprises graduation means configured to indicate to a user predetermined quantized intervals of the distance 807 between the tool 804 and the grass surface 802.

21 Claims, 7 Drawing Sheets

U.S. PATENT DOCUMENTS

| | | | |
|---|---|---|---|
| 6,484,359 B1 * | 11/2002 | Guttmann et al. | 16/18 R |
| 6,651,415 B2 * | 11/2003 | Burke | 56/17.2 |
| 6,732,500 B1 * | 5/2004 | Myers | 56/17.2 |
| 6,868,658 B2 * | 3/2005 | Velke et al. | 56/15.8 |
| 7,392,645 B1 | 7/2008 | Elmore | 56/249 |
| 2003/0140611 A1 * | 7/2003 | Burke | 56/17.2 |

FOREIGN PATENT DOCUMENTS

| | | |
|---|---|---|
| EP | 1 495 661 | 1/2005 |
| GB | 1 164 603 | 9/1969 |
| GB | 1 180 381 | 2/1970 |
| GB | 2 147 185 | 5/1985 |
| GB | 2448977 | 11/2009 |
| GB | 2427992 | 12/2009 |
| JP | 09-65744 | 3/1997 |
| JP | 10-178859 | 7/1998 |
| WO | WO 91/03927 | 4/1991 |
| WO | WO 92/12352 | 7/1992 |

OTHER PUBLICATIONS

UK Examination Report, pp. 1-5 (Jan. 11, 2008).
UK Examination Report, pp. 1-3 (Jul. 28, 2008).
UK Examination Report, pp. 1-6 (Aug. 29, 2008).
UK Examination Report, pp. 1-3 (Oct. 7, 2008).
CA Examination Report, pp. 1-2 (Nov. 13, 2008).
UK Examination Report, pp. 1-3 (May 22, 2009).
UK Examination Report, pp. 1-3 (Aug. 20, 2009).
"FT Mower Brochure" from Dennis Mowers, www.dennisuk.com/dennismowers/brochure, pp. 1-3 (undated).

* cited by examiner

GRASS TREATMENT DEVICE

FIELD OF THE INVENTION

The invention relates to the field of grass treatment devices, and in particular to the field of adjustment devices for grass treatment devices.

BACKGROUND OF THE INVENTION

Grass treatment devices are used for treating grass surfaces such as lawns, playing fields, parkland and golf courses. Types of grass treatment device include, but are not limited to, mowers, rollers, scarifiers, and spikers.

In certain applications, the height of the grass treatment tool is critical. For example, when mowing a golf green the mower blades must, in some circumstances, be at a specified height above the grass to an accuracy of within 0.25 mm. Other grass treatment devices must, in some circumstances be accurate to a similar degree.

Grass treatment tools are usually mounted on a grass treatment device. For many prior art grass treatment machines, such as those manufactured by John Deere, Toro or Jacobsen, three grass treatment devices are mounted on one machine in a reverse echelon disposition having two grass treatment devices at the front of the machines in the direction of travel, and a third grass treatment device mounted behind the first two.

Figure 1:
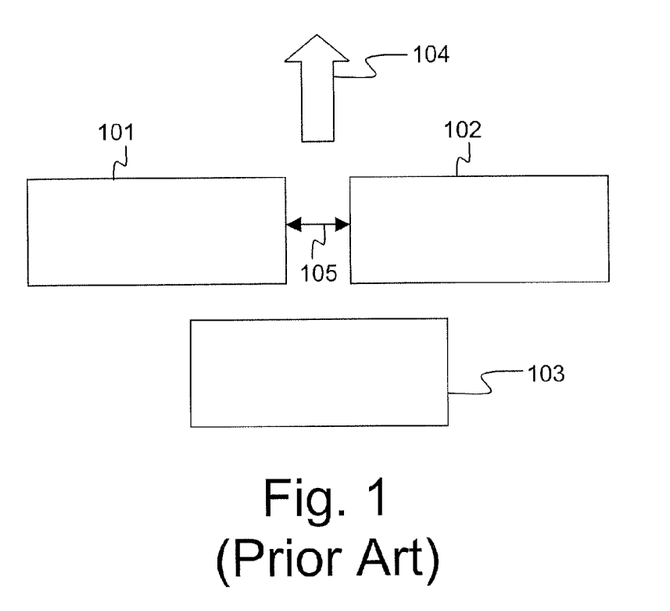
FIG. 1 illustrates schematically the disposition of grass treatment devices on a known grass treatment machine.

Referring to FIG. 1 herein, there is illustrated schematically the disposition of grass treatment devices on a known grass treatment machine. A first grass treatment device 101 is disposed adjacent to a second grass treatment device 102. A third grass treatment device 103 is disposed behind the first 101 and second 102 grass treatment devices relative to the direction of travel 104 of the grass treatment machine. The third grass treatment device 103 is provided to ensure that the grass surface to be treated in the space 105 between the first grass treatment device 101 and the second grass treatment device 102 is also treated, by the third grass treatment device 103.

Figure 2:
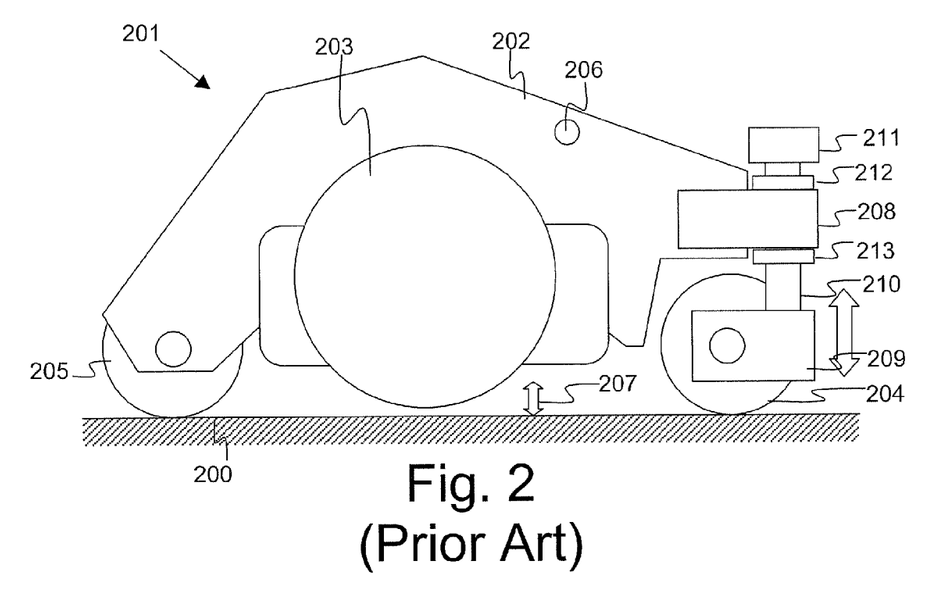
FIG. 2 illustrates schematically a side elevation view of a prior art grass treatment device.

Referring to FIG. 2 herein, there is illustrated schematically a side elevation view of a prior art grass treatment device. The grass treatment device 201 comprises a frame having two end panels disposed either side of a pair of rollers and a grass treatment tool. A first end panel 202 has a grass treatment tool 203 mounted on it. The grass treatment tool 203 may also include any suitable grass treatment tool, such as a roller, a mower, a scarifier or a spiker.

A first roller 204 is disposed towards the front of the first end panel 202 relative to the direction of travel of the grass treatment machine. A second roller 205 is disposed towards the rear of the first end panel 202 relative to the direction of travel of the grass treatment machine. The rollers are provided to assist in smooth movement of the grass treatment device 201 over the grass surface 200, and to maintain a constant height of the grass treatment tool 203 relative to the grass surface 200. The grass treatment device 201 further comprises means 206 to attach the grass treatment device 201 to the grass treatment machine. A second end panel (not shown) is disposed opposite the first end panel 202 at the opposite ends to the rollers 204, 205 and the grass treatment tool 203.

For known grass treatment devices 201, the height 207 of the grass treatment tool 203 relative to the grass surface 200 can be adjusted by altering the distance of the first roller 204 relative to the first end panel 202.

The adjustment means to adjust the distance of the first roller 204 relative to the first end panel 202, also referred to as an "adjuster," comprises a first bracket 208 disposed on the end panel 202 towards the front of the first end panel 202 relative to the direction of travel of the grass treatment machine, and a second bracket 209 attached to the first roller 204. The first bracket 208 is operatively connected to the second bracket by means of a threaded shaft 210. An upper portion of the threaded shaft 210 comprises a handle 211.

By turning the handle 211, the threaded shaft 210 rotates about its longitudinal axis and the distance of the second bracket 209 from the first bracket 208 can be adjusted. In this way, the distance of the first roller 204 relative to the first end panel 202 can be adjusted. This adjustment must be made both at the first end panel 202, and at the second end panel (not shown) disposed at the opposite end of the first roller 204.

A first locking nut 212 is disposed about the threaded bar 210 above the first bracket 208, and a second locking nut 213 is disposed about the threaded bar 210 below the second bracket. By tightening the locking nuts 212, 213, the position of the first roller 204 relative to the first end panel 202 can be temporarily fixed.

By altering the distance of the first roller 204 relative to the first end panel 202, the height 207 of the grass treatment tool 203 relative to the grass surface is also altered.

Problems with this system include the necessity for taking a measurement of the first roller 204 relative to the first end panel 202 during the process of adjusting the distance of the first roller 204 relative to the end panel 202. This can necessitate taking many measurements as the adjustment is being made to ensure that the correct distance is set.

Furthermore, there is a greater margin for error when taking these measurements as the distance can vary either side of the desired distance depending on the way in which the distance is measured. This can be a significant problem when adjusting the distance of the first roller 204 relative to the first end panel 202 and the second end panel (not shown), as differences in the distance could lead to the grass treating tool 203 being disposed at an angle relative to the grass surface, leading to uneven grass treatment.

Furthermore, when tightening the locking nuts 212, 213, the required distance of the first roller 204 relative to the first end panel 202 can be fractionally altered from the required distance.

SUMMARY OF THE INVENTION

The inventors have realized the problems associated with prior art methods of adjusting a distance between a grass treatment tool and a grass surface, and devised a grass treatment device having an adjustment device that is capable of adjusting a distance between the grass treatment tool and the grass surface in predetermined quantized units of distance. The inventors have also devised a gauge to indicate to a user the height of a grass treatment tool relative to a grass surface. Each of these individually reduce the margin of error when adjusting the distance between the grass treatment tool and the grass surface, and greatly reduce the time it takes to adjust the distance between the grass treatment tool and the grass surface.

According to a first aspect, there is provided a grass treatment device comprising:
  a. a first roller configured to contact a grass surface;
  b. a second roller configured to contact a grass surface;
  c. a treatment tool capable of treating a grass surface;
  d. adjustment means or adjuster is configured to allow an adjustment of a distance between the treatment tool and the first roller, the adjustment capable of affecting a distance between the tool and the grass surface;

e. characterized in that the adjustment means further comprises graduation means configured to indicate to a user predetermined quantized intervals of the distance between the tool and the grass surface.

Preferably, the grass treatment further comprises a gauge configured to indicate to a user a distance between the grass treatment tool and the grass surface.

Preferably, the adjustment means comprises:
a. a first shaft operatively connected to the grass treatment device;
b. a second shaft operatively connected to the first roller;
c. wherein the first shaft and the second shaft are configured to move relative to each other along a main axis of the first shaft and the second shaft.

Preferably, the graduation means, also referred to as an "indicator," comprises:
a. at least one depression disposed on an outer surface of the first shaft; and
b. a projecting lug configured to co-operate with the depression biasing means configured to bias the projecting lug towards the depression.

Preferably, the indicator or graduation means comprises a ball detent, the first shaft comprises a plurality of depressions disposed radially about an outer surface of the first shaft; and a distance between each depression of the plurality of depressions is configured to correspond with the predetermined quantized intervals of the distance between the treatment tool and the grass surface.

Preferably, the first shaft comprises a hollow cylinder having a threaded inner wall; and the second shaft comprises a solid cylinder having a threaded outer wall; and the threaded outer wall of the second shaft is configured to co-operate with the threaded inner wall of the first shaft; whereby a rotational movement of the first shaft is configured to effect a linear movement of the second shaft along a main axis of the second shaft.

Preferably, a pitch of the thread of the threaded outer wall and the threaded inner wall is configured to relate to an amount of linear movement of the second shaft relative to the first shaft in response to a predetermined rotational angle of the first shaft relative to the second shaft.

Preferably, a radius of the outer shaft is configured to relate to an amount of linear movement of the second shaft relative to the first shaft in response to a predetermined rotational angle of the first shaft relative to the second shaft.

According to a second aspect, there is provided a grass treatment device height adjustment device comprising:
a. adjustment means or an adjuster to adjust a distance of a roller relative to the grass treatment device, the roller being mounted on the grass treatment device,
b. characterized in that the adjustment means further comprises graduation means configured to indicate to a user predetermined quantized intervals of the distance.

Preferably, the grass treatment device height adjustment further comprises a gauge configured to indicate to a user a distance between a grass treatment tool and a grass surface.

Preferably, the adjuster or adjustment means comprises:
a. a first shaft operatively connected to the grass treatment device;
b. a second shaft connected to the roller;
c. wherein the first shaft and the second shaft are configured to move relative to each other along a main axis of the first shaft and the second shaft.

Preferably, the indicator or graduation means comprises:
a. at least one depression disposed on an outer surface of the first shaft;
b. a projecting lug configured to co-operate with the depression
c. biasing means configured to bias the projecting lug towards the depression.

Preferably, the graduation means comprises a ball detent, the first shaft comprises a plurality of depressions disposed radially about an outer surface of the first shaft; and a distance between each depression of the plurality of depressions is configured to correspond with the predetermined quantized intervals of the distance of the treatment tool and relative to the grass surface.

Preferably, the first shaft comprises a hollow cylinder having a threaded inner wall; and the second shaft comprises a solid cylinder having a threaded outer wall; and the threaded outer wall of the second shaft is configured to co-operate with the threaded inner wall of the first shaft; whereby a rotational movement of the first shaft is configured to effect a linear movement of the second shaft along a main axis of the second shaft.

Preferably, a pitch of the thread of the threaded outer wall and the threaded inner wall is configured to give a predetermined linear movement of the second shaft relative to the first shaft in response to a predetermined rotational angle of the first shaft relative to the second shaft.

Preferably, a radius of the outer shaft is configured to relate to an amount of linear movement of the second shaft relative to the first shaft in response to a predetermined rotational angle of the first shaft relative to the second shaft.

According to a third aspect, there is provided a grass treatment device comprising:
a. a treatment tool capable of treating a grass surface;
b. adjustment means configured to allow an adjustment of a distance between the grass treatment tool and the grass surface;
c. a gauge configured to indicate to a user a distance between the grass treatment tool and the grass surface.

Preferably, the gauge is releasably attachable to the grass treatment device.

Alternatively, the gauge is formed integrally with the grass treatment device.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which.

DETAILED DESCRIPTION

There will now be described by way of example a specific mode contemplated by the inventors. In the following description numerous specific details are set forth in order to provide a thorough understanding. It will be apparent however, to one skilled in the art, that the present invention may be practiced without limitation to these specific details. In other instances, well-known methods and structures have not been described in detail so as not to unnecessarily obscure the description.

Throughout the description and claims, reference is made to a roller, although it will be apparent to those skilled in the art that the term roller encompasses substantially cylindrical rollers or wheels.

Figure 3:
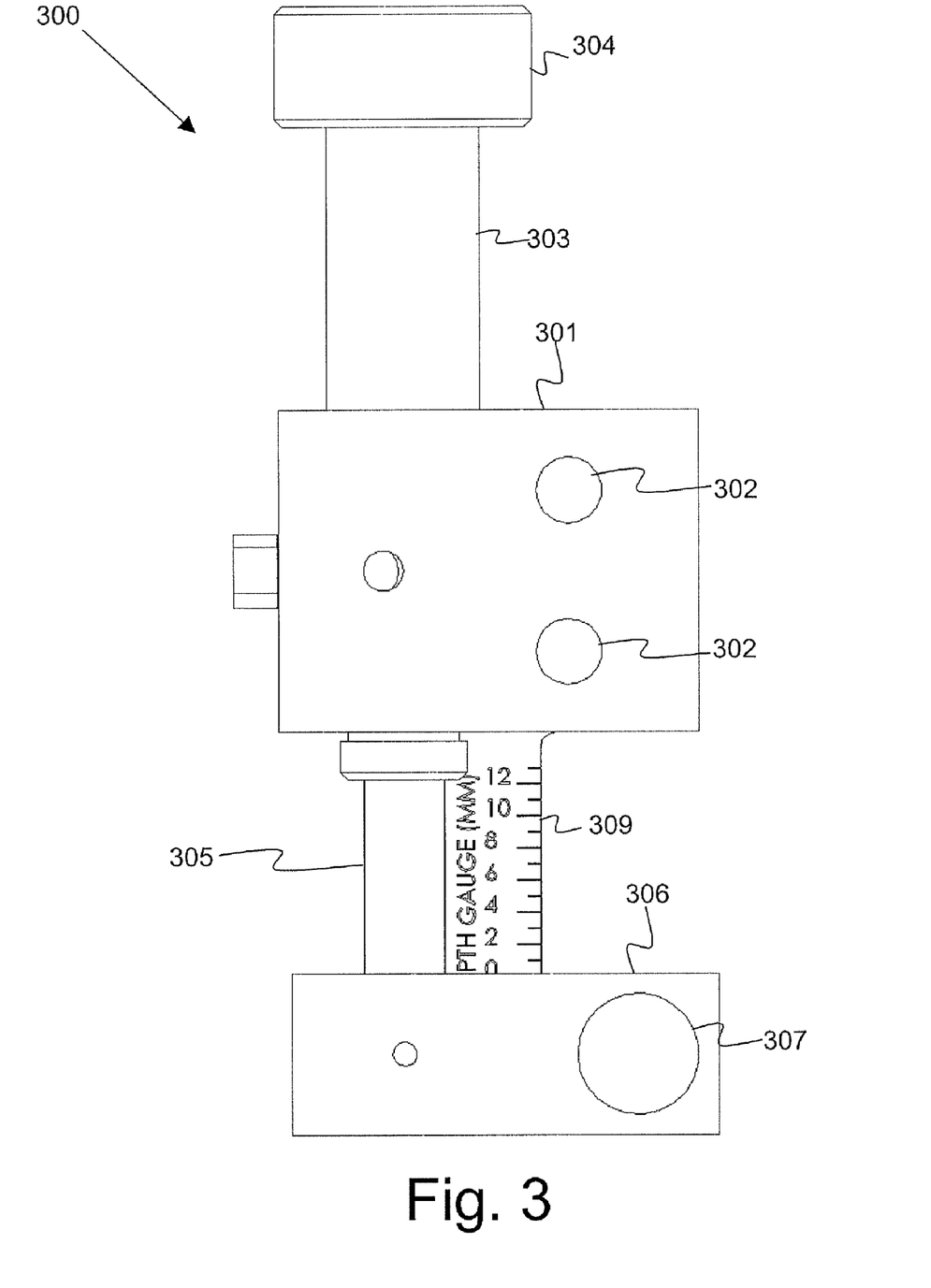
FIG. 3 illustrates schematically a side elevation view of a height adjustment device for a grass treatment device.

Referring to FIG. 3 herein, there is illustrated schematically a side elevation view of a height adjustment device 300 for a grass treatment device. There is provided a unit attachment bracket 301 configured to attach to a grass treatment device. According to the first specific embodiment, the unit attachment bracket 301 attaches to an end panel 202 of an existing grass treatment device. The unit attachment bracket comprises device attachment points at which the unit attachment bracket 301 is configured to attach to the end panel 202 by way of any standard attachment means, for example threaded bolts.

There is also provided an outer shaft 303 configured to be disposed in a hole (not shown) through the unit attachment bracket 301. The outer shaft comprises a handle 304 by which a user can rotate the outer shaft 303 about its longitudinal axis. The handle has profiling such as knurling about its outer surface to improve the user's grasp of the handle.

An inner shaft 305 is also provided, operatively attached to the outer shaft 303. A roller attachment bracket 306 is connected to a lower end of the inner shaft 305. The roller attachment bracket 306 comprises a roller attachment point 307, and an inner shaft attachment point 308.

A depth gauge 309 is provided disposed substantially between the unit attachment bracket 301 and the roller attachment bracket 306. The depth gauge 309 has markings on its surface to indicate to a user the height of the grass treatment tool relative to the grass surface.

Figure 4:
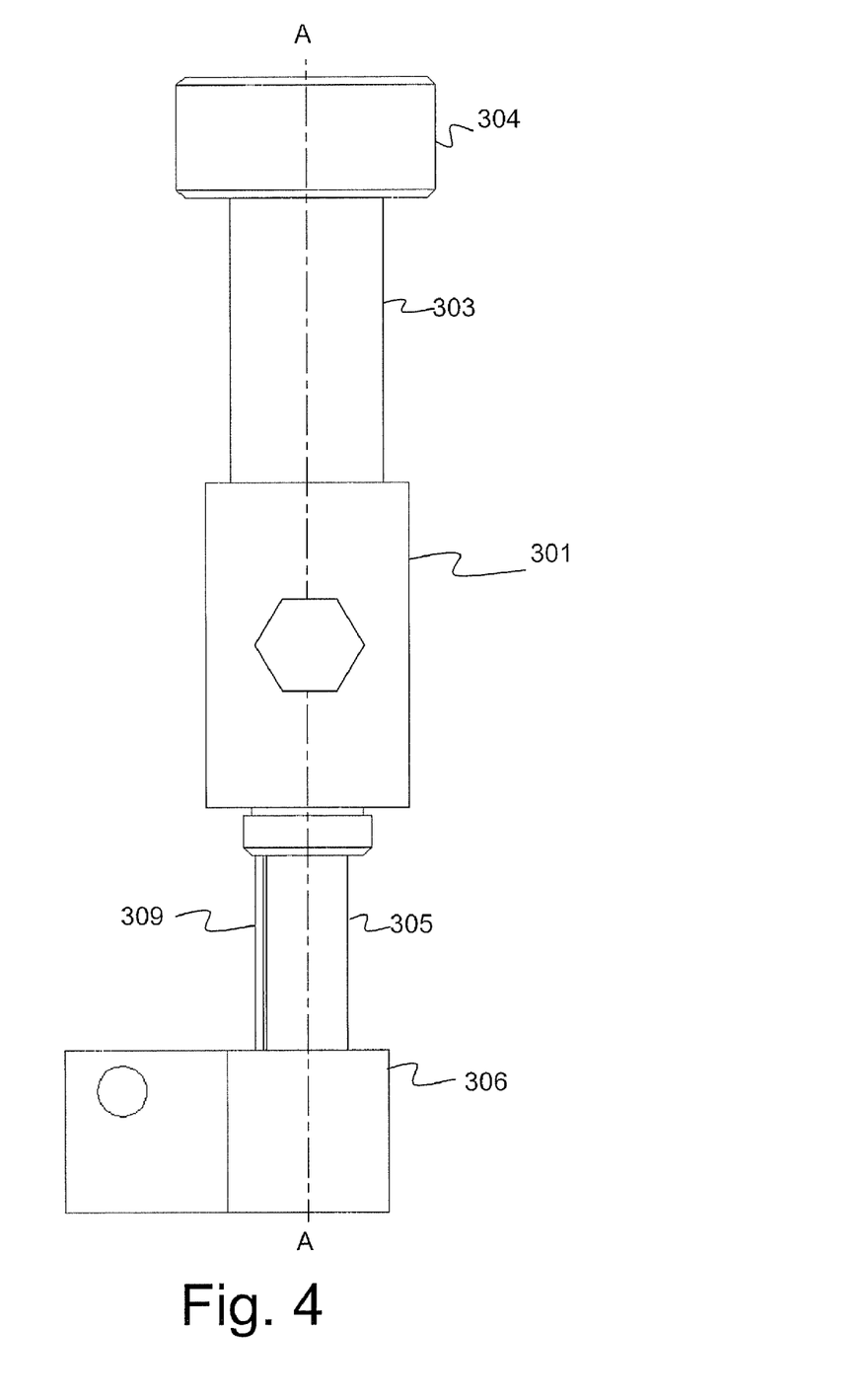
FIG. 4 illustrates schematically a front elevation view of the height adjustment device for a grass treatment device.

Referring to FIG. 4 herein, there is illustrated schematically a front elevation view of the height adjustment device for a grass treatment device. The depth gauge 309 is offset from the inner shaft 305 to ensure it doesn't impinge on the inner shaft 305.

Figure 5:
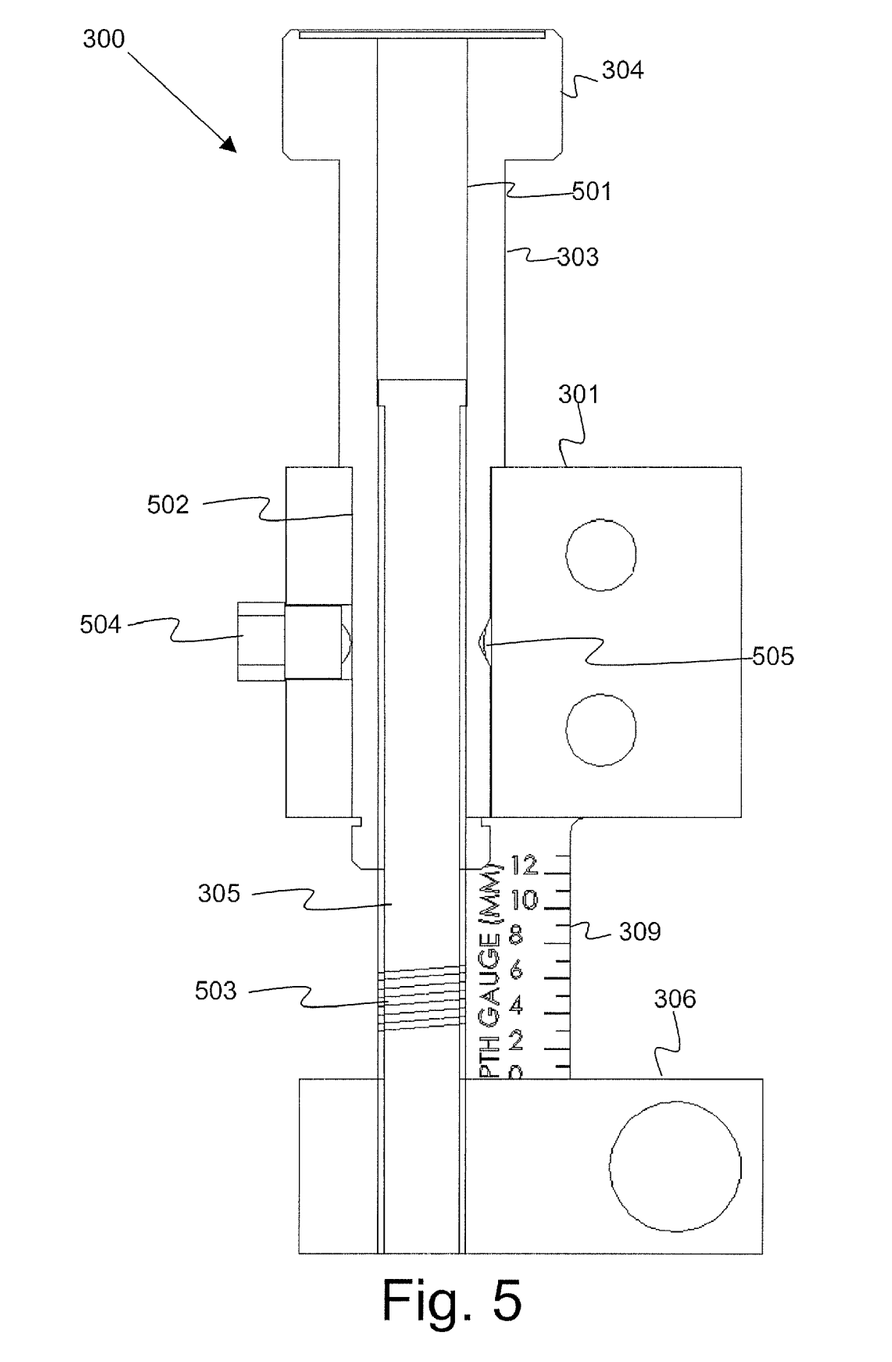
FIG. 5 illustrates schematically a cross-section side elevation view of the height adjustment device for a grass treatment device.

Referring to FIG. 5 herein, there is illustrated schematically a cross-section side elevation view of the height adjustment device for a grass treatment device. The cross-section is taken through line AA of FIG. 4.

The outer shaft 303 comprises an annular cylinder having an inner wall 501. The inner walls 501 of the outer shaft are threaded. The outer shaft 303 passes through an outer shaft hole 502 in the unit attachment bracket 301.

The inner shaft 305 is also threaded along its length, a portion of which is shown 503. The threads 503 of the inner shaft 305 are configured to interact with the threads of the inner wall 501 of the outer shaft 303, such that a rotation of the outer shaft 303 causes a linear movement of the inner shaft 305 relative to the outer shaft 303 along the longitudinal axis of the inner shaft 305.

In this way, by rotating the handle 304, the outer shaft 303 is rotated and the inner shaft 305 moves linearly relative to the outer shaft 303 along its longitudinal axis. The outer shaft is connected to the unit attachment bracket 301, and the unit attachment bracket 301 is attached to the grass treatment device, and the roller attachment bracket 306 is disposed at a lower end of the inner shaft 305, and so rotation of the handle 304 effects linear movement of the roller attachment bracket 306 relative to the end plate of the grass treatment device. By altering the distance of the roller attachment bracket 307 relative to the end plate 202, the distance of a roller that is attached to the roller attachment bracket 307 relative to the end plate 202 is altered. This in turn alters the distance of the grass treatment tool above the grass surface. The distance is also relative to the distance between the roller attached to the roller attachment bracket 307 and the grass treatment tool.

The provision of the depth gauge 309 indicates to a user the height of the grass treatment tool relative to the grass surface. The marks on the depth gauge can be configured to show the distance between the grass treatment tool and the grass surface in intervals of, for example, 0.25 mm. The distance between the grass treatment tool and the grass surface will not correspond exactly with the distance on the depth gauge, as the grass treatment tool is offset from the depth gauge. However, the scale indicated on the depth gauge 309 can be adjusted to accurately indicate the distance between the grass treatment tool and the grass surface.

Errors can be introduced in reading the depth gauge, for example parallax errors depending on the user's viewpoint when reading the depth gauge 309. To reduce these errors, means are provided to allow the user to adjust the distance of the roller attachment bracket 307 relative to the end plate 202 by predetermined quantized amounts only. This in turn adjusts the distance between the grass treatment tool and the grass surface by a predetermined quantized amount. This reduces the possibility of errors being introduced by, for example, setting slightly different distances between each roller attachment bracket relative to its corresponding end plate either side of the roller.

The means to allow the user to adjust the distance of the roller attachment bracket 307 relative to the end plate 202 by a predetermined quantized amount comprises a ball detent 504 and at least one depression 505 in the outer surface of the outer shaft 303. The ball detent 504 is disposed having a longitudinal axis perpendicular to the longitudinal axis of the outer shaft 303. The ball detent is fixed in position relative to the outer shaft 303 such that it is in contact with the outer shaft. The ball detent 504 is fixed in position through a locating orifice in the unit attachment bracket 301.

Figure 6A:
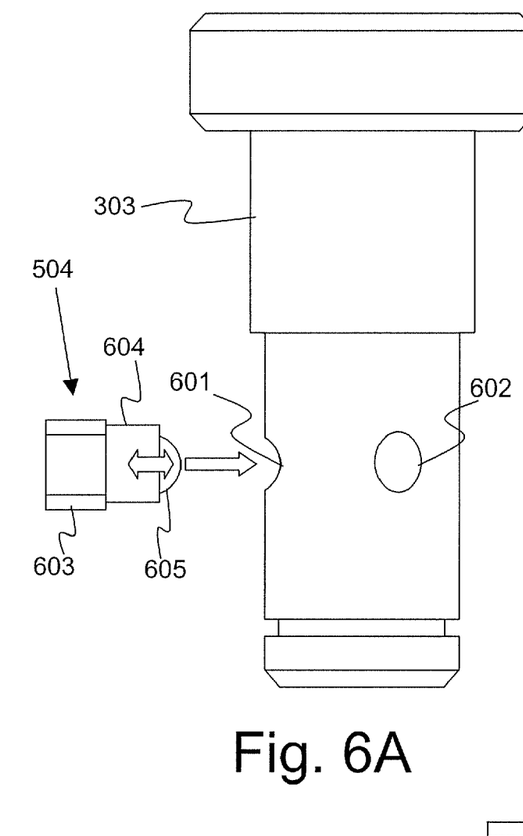
FIG. 6A illustrates schematically a side elevation view of the outer shaft and a ball detent.
Figure 6B:
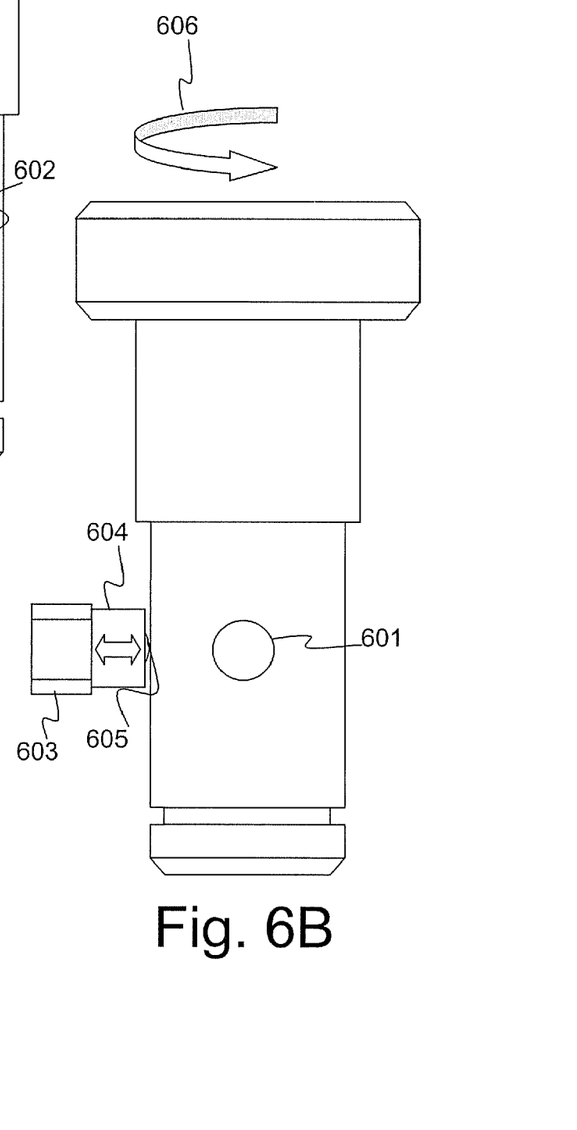
FIG. 6B schematically illustrates a side elevation view of the interaction between the outer shaft and a ball detent during rotational movement of the outer shaft.

Referring to FIGS. 6A and 6B herein, there is illustrated schematically a side elevation view of the outer shaft 303 and the ball detent 504 and the interaction between the ball detent 504 and the outer shaft 303 during rotation of the outer shaft 303. The outer shaft 303 comprises a plurality of depressions 601, 602 disposed radially about its surface. The ball detent 504 comprises a head 603, by which the ball detent 504 can be manipulated by the user. A ball housing 604 extends from the head 603. An outer wall of the ball housing 604 is threaded to allow the ball housing 604 to co-operate with a threaded orifice in the unit attachment bracket 301. A ball 605 protrudes from the ball housing at the end of the ball housing 604 opposite the head 603. The ball is biased by any suitable biasing means, such as a spring, such that it is biased to towards a position farthest away from the head 603. By the application of pressure to the ball 605, the ball 605 can enter the ball housing 604. When pressure is removed from the ball 605, the ball 605 moves back to its biased position away from the head 603.

The ball 605 is configured to releasably lock with the depressions 601, 602 in the surface of outer shaft 303. When the ball 605 is located in a depression 601, it takes more force to rotate the outer shaft 303 about its longitudinal axis than when the ball if not located in a depression 601, 602. When the ball 605 is not releasably locked into a depression 601, it takes little effort to rotate 606 the outer shaft 303 about its longitudinal axis.

When the user rotates 606 the outer shaft, he or she feels a jolt each time the ball 605 releasably locks into a depression 601, 602 on the outer shaft 303. When the user is satisfied that the outer shaft 303 has been sufficiently rotated to achieve the required distance of a roller that is attached to the roller attachment bracket 307 relative to the end plate 202, the ball 605 releasably locks into place in a depression 601 of the outer shaft 303. The strength of the biasing means is sufficient to keep the ball 605 locked into the depression 601 during normal use of the grass treatment device. The ball 605 can only be released from the depression 601 by further rotation 606 of the outer shaft 303.

By careful selection of the outer radius of the outer shaft 303, the number of depression 601, 602 and the pitch of the corresponding threads of the inner shaft 305 and threads of the inner wall 501 of the outer shaft 303, the distance of linear movement of the inner shaft 305 relative to the outer shaft 303 can be related to the distance between depressions 601, 602 on the outer shaft.

For example, by providing three depressions on the outer surface of the outer shaft 303, and selection of the radius and pitch of the outer shaft, a 120° rotation of the handle 304 of the outer shaft 303 moves the ball 605 from the first depression to the second depression, and in turn moves the inner shaft 305 linearly by 0.25 mm relative to the outer shaft 303. In this way, the user receives an indication of each 0.25 mm linear movement of the inner shaft 305 relative to the outer shaft 303 in the form of a small jolt each time the ball 605 locks into a depression. This allows the user to adjust the distance of the roller attachment bracket 307 relative to the end plate 202 by predetermined quantized amounts of 0.25 mm. This distance is proportional to the distance between the roller and the grass treatment tool, and to the height of the grass treatment tool above the grass surface.

Of course, by selecting a different radius of outer shaft 303, or a different pitch of threads, or a different number of depressions, on the outer shaft 303, the predetermined quantized amount can be altered. For example, if the outer shaft 303 comprises only one depression, and the other dimensions remain unchanged, then the predetermined quantized amount is 0.75 mm. By using a predetermined quantized amount, the scope for an error in setting the distance is much reduced. Similarly, by using a ball detent 504 to releasably lock the outer shaft 303, the problems associated with locking nuts as used in the prior art are also obviated.

Figure 7:
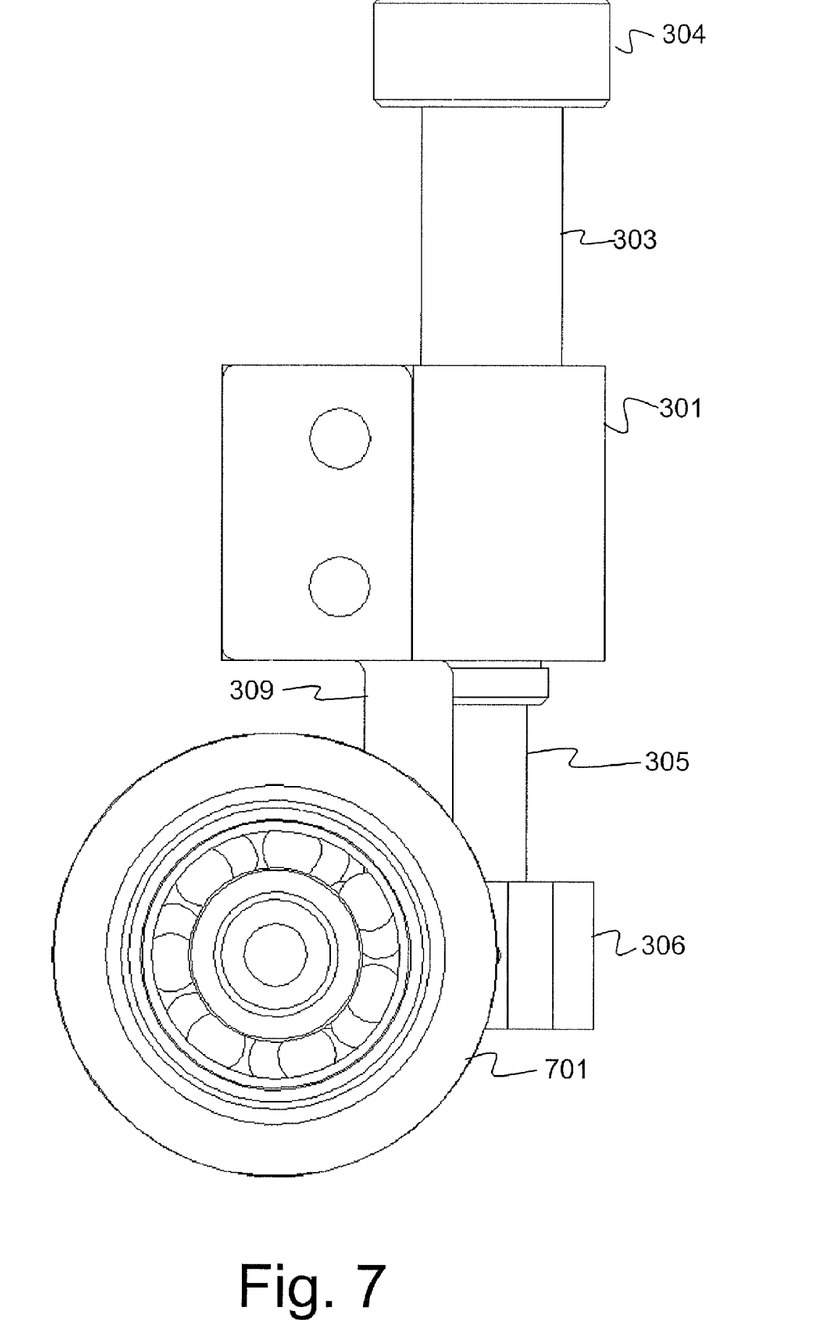
FIG. 7 illustrates schematically a side elevation view of the height adjustment device attached to a roller.

Referring to FIG. 7 herein, there is illustrated schematically a side elevation view of the height adjustment device attached to a roller. A roller 701 is rotatably mounted to the roller attachment bracket 306.

Figure 8:
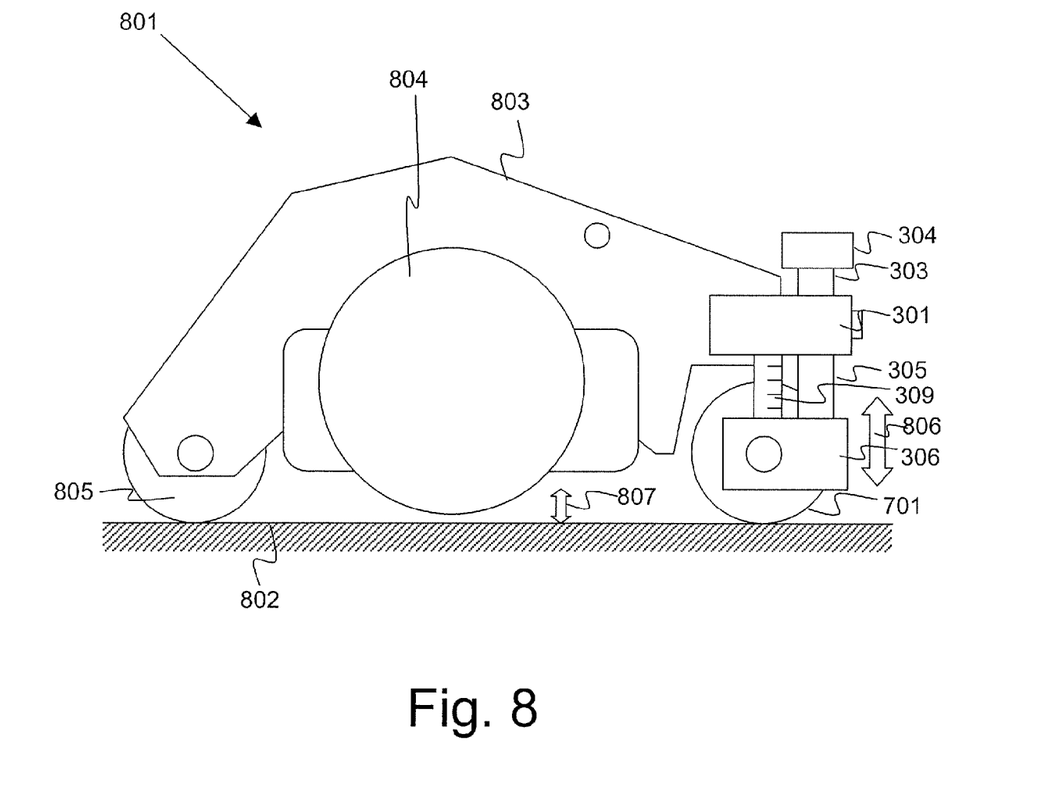
FIG. 8 illustrates schematically a side elevation view of a grass treatment device comprising the height adjustment device.

Referring to FIG. 8 herein, there is illustrated schematically a side elevation view of a grass treatment device comprising the height adjustment device. The grass treatment device 801 is configured to be used on a grass surface 802. The grass treatment device 801 comprises a body in the form of two end plates (only one end plate 803 shown in side elevation view). The unit attachment bracket 301 is attached to the end plate 803. A grass treatment tool 804 is mounted to the end plate, and a second roller 805 is also rotatably mounted to the end plate 803. The first roller 701 and the second roller 805 are configured to be in contact with the grass surface 802. They are provided to assist movement of the grass treatment device 801 over the grass surface 802, and to maintain a constant height 807 of the grass treatment tool 804 above the grass surface 802.

By adjusting a distance 806 of the first roller 701 relative to the unit attachment bracket 301, the height 807 of the grass treatment tool 804 above the grass surface is adjusted. A distance between the first roller 701 and the treatment tool 804 can be vertical displacement of the first roller 701 relative to the treatment tool 804.

This adjustment is made either side of the rollers 701, 805 and the treatment tool 804.

According to a second specific embodiment, the unit attachment bracket is formed integrally with the end panel. In all other respects, the second specific embodiment is identical to the first specific embodiment.

According to a third specific embodiment, a gauge 309 is provided to allow a user to judge a distance of the first roller 701 relative to the unit attachment bracket. However, no means are provided to allow the user to adjust the distance of the roller 701 relative to the unit attachment bracket 301 by predetermined quantized amounts. This allows the user to adjust the height of the grass treatment tool above the grass surface without the need of a separate marker or scale bar.

The third specific embodiment is otherwise compatible with either of the first or second specific embodiments.

According to a fourth specific embodiment, gauge may be releasably attachable to the grass treatment device, or formed integrally with the grass treatment device. Where the gauge is releasably attachable to the grass treatment device, it may be retrofitted to an existing grass treatment device.

The fourth specific embodiment is otherwise compatible with any of the first, second or third specific embodiments.

While the present invention has been described with reference to its preferred embodiments, those skilled in the art will understand that variations in materials, configuration, dimension, operation and methods, which are within the skill of the artisan are considered to fall within the scope of the present invention which is limited only by the claims appended hereto.

The invention claimed is:

1. A grass treatment device comprising:
a first roller configured to contact a grass surface;
a second roller configured to contact a grass surface;
an adjuster configured to allow an adjustment of a distance from said first roller, said adjustment capable of affecting a distance from said grass surface;
said adjuster comprising a first shaft operatively connected to said grass treatment device such that said first shaft is rotatable about the longitudinal axis of said shaft, a second shaft operatively connected to said first roller, said first shaft and said second shaft are configured to move relative to each other in threaded engagement following a predetermined thread pitch for longitudinal movement along a main axis of said first shaft and said second shaft and an indicator comprising at least one depression formed in said first shaft and a ball detent mechanism configured to engage with said depression at a predetermined rotational position of the first shaft, the indicator being specifically configured to accurately indicate to a user by a tactile jolt caused by engagement of the ball detent mechanism with said depression a number of predetermined quantized intervals of said distance from said grass surface by virtue of said rotation of said first shaft; and in addition to said indicator, said grass treatment device further comprises a gauge that is configured to visually indicate to said user a distance from said grass surface;

said ball detent mechanism and gauge being mutually calibrated based on said thread pitch and on the number of and angular position of said at least one depression such that rotation of said first shaft causes the ball detent mechanism to produce the tactile jolt in synchronism with a predetermined quantized linear displacement measured by the gauge.

2. A grass treatment device as claimed in claim 1 wherein said at least one depression is disposed on an outer surface of said first shaft; wherein the ball detent mechanism comprises configured to co-operate with said depression and biasing means configured to bias said projecting lug towards said depression.

3. A grass treatment device as claimed in claim 1 wherein said first shaft comprises a plurality of depressions disposed radially about an outer surface of said first shaft; and a distance between each depression of said plurality of depressions is configured to correspond with said predetermined quantized intervals of a distance between a treatment tool and said grass surface.

4. A grass treatment device as claimed in claim 1 wherein said first shaft comprises a hollow cylinder having a threaded inner wall; said second shaft comprises a solid cylinder having a threaded outer wall; and said threaded outer wall of said second shaft is configured to co-operate with said threaded inner wall of said first shaft; whereby a rotational movement of said first shaft is configured to effect a linear movement of said second shaft along a main axis of said second shaft.

5. A grass treatment device as claimed in claim 2 wherein said first shaft comprises a hollow cylinder having a threaded inner wall; said second shaft comprises a solid cylinder having a threaded outer wall; and said threaded outer wall of said second shaft is configured to co-operate with said threaded inner wall of said first shaft; whereby a rotational movement of said first shaft is configured to effect a linear movement of said second shaft along a main axis of said second shaft.

6. A grass treatment device as claimed in claim 3 wherein said first shaft comprises a hollow cylinder having a threaded inner wall; said second shaft comprises a solid cylinder having a threaded outer wall; and said threaded outer wall of said second shaft is configured to co-operate with said threaded inner wall of said first shaft; whereby a rotational movement of said first shaft is configured to effect a linear movement of said second shaft along a main axis of said second shaft.

7. A grass treatment device as claimed in claim 4 wherein the pitch of said thread of said threaded outer wall and said threaded inner wall is configured to relate to an amount of linear movement of said second shaft relative to said first shaft in response to the predetermined rotational position of said first shaft relative to said second shaft.

8. A grass treatment device as claimed in claim 7 wherein a radius of said outer shaft is configured to relate to an amount of linear movement of said second shaft relative to said first shaft in response to the predetermined rotational position of said first shaft relative to said second shaft.

9. A grass treatment device height adjustment device comprising an adjuster configured to adjust a distance of a roller relative to said grass treatment device, said roller being mounted on said grass treatment device, said adjuster further comprising a first shaft operatively connected to said grass treatment device such that said first shaft is rotatable about the longitudinal axis of said first shaft, a second shaft operably connected to said roller, said first shaft and said second shaft are operatively connected in threaded engagement following a predetermined thread pitch such that upon said first shaft being rotated, said first shaft and said second shaft are configured to move relative to each other along a main axis of said first shaft and said second shaft and an indicator comprising at least one depression formed in said first shaft and a ball detent mechanism configured to engage with said depression at a predetermined rotational position of the first shaft, the indicator being specifically configured to accurately indicate to a user by a tactile jolt caused by engagement of the ball detent mechanism with said depression a number of predetermined quantized intervals of said distance by said rotation of said first shaft; and in addition to said indicator, said grass treatment device further comprises a gauge that is configured to visually indicate to said user said distance;

said ball detent mechanism and gauge being mutually calibrated based on said thread pitch and on the number of and angular position of said at least one depression such that rotation of said first shaft causes the ball detent mechanism to produce the tactile jolt in synchronism with a predetermined quantized linear displacement measured by the gauge.

10. A grass treatment device height adjustment device as claimed in claim 9 wherein said at least one depression is disposed on an outer surface of said first shaft; wherein the ball detent mechanism comprises a projecting lug configured to co-operate with said depression and biasing means configured to bias said projecting lug towards said depression.

11. A grass treatment device height adjustment device as claimed in claim 9 wherein said first shaft comprises a plurality of depressions disposed radially about an outer surface of said first shaft; and a distance between each depression of said plurality of depressions is configured to correspond with said predetermined quantized intervals of a distance between a treatment tool relative to said grass surface.

12. A grass treatment device height adjustment device as claimed in claim 9 wherein said first shaft comprises a hollow cylinder having a threaded inner wall; said second shaft comprises a solid cylinder having a threaded outer wall; and said threaded outer wall of said second shaft is configured to co-operate with said threaded inner wall of said first shaft; whereby a rotational movement of said first shaft is configured to effect a linear movement of said second shaft along a main axis of said second shaft.

13. A grass treatment device height adjustment device as claimed in claim 10 wherein said first shaft comprises a hollow cylinder having a threaded inner wall; said second shaft comprises a solid cylinder having a threaded outer wall; and said threaded outer wall of said second shaft is configured to co-operate with said threaded inner wall of said first shaft; whereby a rotational movement of said first shaft is configured to effect a linear movement of said second shaft along a main axis of said second shaft.

14. A grass treatment device height adjustment device as claimed in claim 10 wherein said first shaft comprises a hollow cylinder having a threaded inner wall; said second shaft comprises a solid cylinder having a threaded outer wall; and said threaded outer wall of said second shaft is configured to co-operate with said threaded inner wall of said first shaft; whereby a rotational movement of said first shaft is configured to effect a linear movement of said second shaft along a main axis of said second shaft.

15. A grass treatment device height adjustment device as claimed in claim 11 wherein said first shaft comprises a hollow cylinder having a threaded inner wall; said second shaft comprises a solid cylinder having a threaded outer wall;

and said threaded outer wall of said second shaft is configured to co-operate with said threaded inner wall of said first shaft; whereby a rotational movement of said first shaft is configured to effect a linear movement of said second shaft along a main axis of said second shaft.

16. A grass treatment device height adjustment device as claimed in claim 12 wherein the pitch of said thread of said threaded outer wall and said threaded inner wall is configured to give a predetermined linear movement of said second shaft relative to said first shaft in response to the predetermined rotational position of said first shaft relative to said second shaft.

17. A grass treatment device height adjustment device as claimed in claim 16 wherein a radius of said outer shaft is configured to relate to an amount of linear movement of said second shaft relative to said first shaft in response to the predetermined rotational position of said first shaft relative to said second shaft.

18. A grass treatment device comprising a first roller configured to contact said grass surface; adjustment means configured to allow an adjustment of a distance from said grass surface; and a gauge configured to visually indicate to a user a distance from said grass surface; wherein said adjustment means comprises a first shaft operatively connected to said grass treatment device such that said first shaft is rotatable about the longitudinal axis of said shaft, a second shaft operatively connected to said first roller, such that upon said first shaft and said second shaft being rotated, said first shaft and said second shaft are configured to move relative to each other in threaded engagement following a predetermined thread pitch for longitudinal movement along a main axis of said first shaft and said second shaft; and said grass treatment device further comprises an indicator comprising at least one depression formed in said first shaft and a ball detent mechanism configured to engage with said depression at a predetermined rotational position of the first shaft, and that, by virtue of said rotation of said first shaft, is the indicator being specifically configured to accurately indicate to a user by a tactile jolt caused by engagement of the ball detent mechanism with said depression a number of predetermined quantized intervals of said distance from said grass surface;

said ball detent mechanism and gauge being mutually calibrated based on said thread pitch and on the number of and angular position of said at least one depression such that rotation of said first shaft causes the ball detent mechanism to produce the tactile jolt in synchronism with a predetermined quantized linear displacement measured by the gauge.

19. A grass treatment device as claimed in claim 18 wherein said gauge is releasably attachable to said grass treatment device.

20. A grass treatment device as claimed in claim 18 wherein said gauge is formed integrally with said grass treatment device.

21. A grass treatment device as claimed in claim 1 wherein with respect to said second shaft said first shaft comprises an outer shaft and said second shaft thus comprises an inner shaft.

* * * * *